(12) United States Patent
Kaes et al.

(10) Patent No.: US 12,435,210 B2
(45) Date of Patent: Oct. 7, 2025

(54) RUBBER COMPOSITION AND A TIRE

(71) Applicant: The Goodyear Tire & Rubber Company, Akron, OH (US)

(72) Inventors: Christian Jean-Marie Kaes, Schrondweiler (LU); Carlo Kanz, Mamer (LU); Malik Djelloul-Mazouz, Bereldange (LU); Melodie Dubreuil, Diekirch (LU); Miriam Laackmann, Langen (DE); Cecilia Aguiar Da Silva, Helmsange (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 17/657,285

(22) Filed: Mar. 30, 2022

(65) Prior Publication Data

US 2023/0086513 A1    Mar. 23, 2023

Related U.S. Application Data

(60) Provisional application No. 63/158,614, filed on Mar. 9, 2021.

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/035* (2013.01)

(58) Field of Classification Search
CPC ...... C08L 9/06; C08L 2205/035; C08L 15/00; C08L 7/00; C08L 57/02; C08L 45/00;
(Continued)

(56) References Cited

U.S. PATENT DOCUMENTS 5,834,552 A * 11/1998 Kawazura ............ B60C 1/0016
                                                    524/526
10,947,368 B2    3/2021 Isitman et al.
(Continued)

FOREIGN PATENT DOCUMENTS

EP    0 698 639    * 12/1998
EP    3 194 490    *  1/2018
EP    3450206 A1    3/2019

OTHER PUBLICATIONS

A Paper—CPCH2260044—Chinese Article dated Dec. 13, 2023.
(Continued)

*Primary Examiner* — Doris L Lee
(74) *Attorney, Agent, or Firm* — Mandy B. Willis

(57) ABSTRACT

In a first aspect, the present invention is directed to a rubber composition comprising 70 phr to 100 phr of styrene butadiene rubber including a first styrene butadiene rubber having a glass transition temperature within a range of −49° C. to −15° C. and a second styrene butadiene rubber having a glass transition temperature within a range of −50° C. to −89° C. Moreover, the rubber composition comprises 10 phr to 30 phr of one or more of natural rubber and synthetic polyisoprene rubber, 40 phr to 70 phr of silica, and 10 phr to 40 phr of at least one hydrocarbon resin selected from one or more of C5 resins, CPD resins, DCPD resins, C9 modified C5 resins, C9 modified CPD resins, and C9 modified DCPD resins. In another aspect, the present invention is directed to a tire comprising a tire tread with the aforementioned rubber composition.

15 Claims, 1 Drawing Sheet

(58) Field of Classification Search
CPC ........ B60C 1/0016; C08K 3/36; C08K 5/548; C08K 5/09; C08K 9/12; C08K 3/04
See application file for complete search history.

(56) References Cited

U.S. PATENT DOCUMENTS

| | | |
|---|---|---|
| 2009/0105403 A1 | 4/2009 | Hirabayashi |
| 2012/0208919 A1* | 8/2012 | Kanz .................. C08L 15/00 523/156 |
| 2014/0135437 A1 | 5/2014 | Sandstrom et al. |
| 2017/0114212 A1 | 4/2017 | Pompei et al. |
| 2017/0198122 A1 | 7/2017 | Rodgers et al. |
| 2018/0170105 A1 | 6/2018 | Sakurai |
| 2018/0290489 A1 | 10/2018 | Mangeret et al. |
| 2019/0062534 A1* | 2/2019 | Broemmel ............... C08L 9/06 |
| 2019/0062535 A1 | 2/2019 | Broemmel |
| 2019/0062537 A1* | 2/2019 | Mejia ................... C08K 5/5419 |
| 2019/0194427 A1 | 6/2019 | Takano |
| 2020/0048439 A1 | 2/2020 | Ganesan et al. |
| 2020/0071506 A1 | 3/2020 | Steiner |
| 2021/0024739 A1 | 1/2021 | Jacoby |
| 2021/0032442 A1 | 2/2021 | Steiner |
| 2021/0032443 A1 | 2/2021 | Steiner |

OTHER PUBLICATIONS

Chinese Office Action for Application No. 202210224744.6, dated Dec. 14, 2023.
Chinese Office Action for Application No. 202210224744.6, dated Jul. 4, 2024.
European Search Report for Application No. 22159627.3, dated Jul. 14, 2022.

* cited by examiner

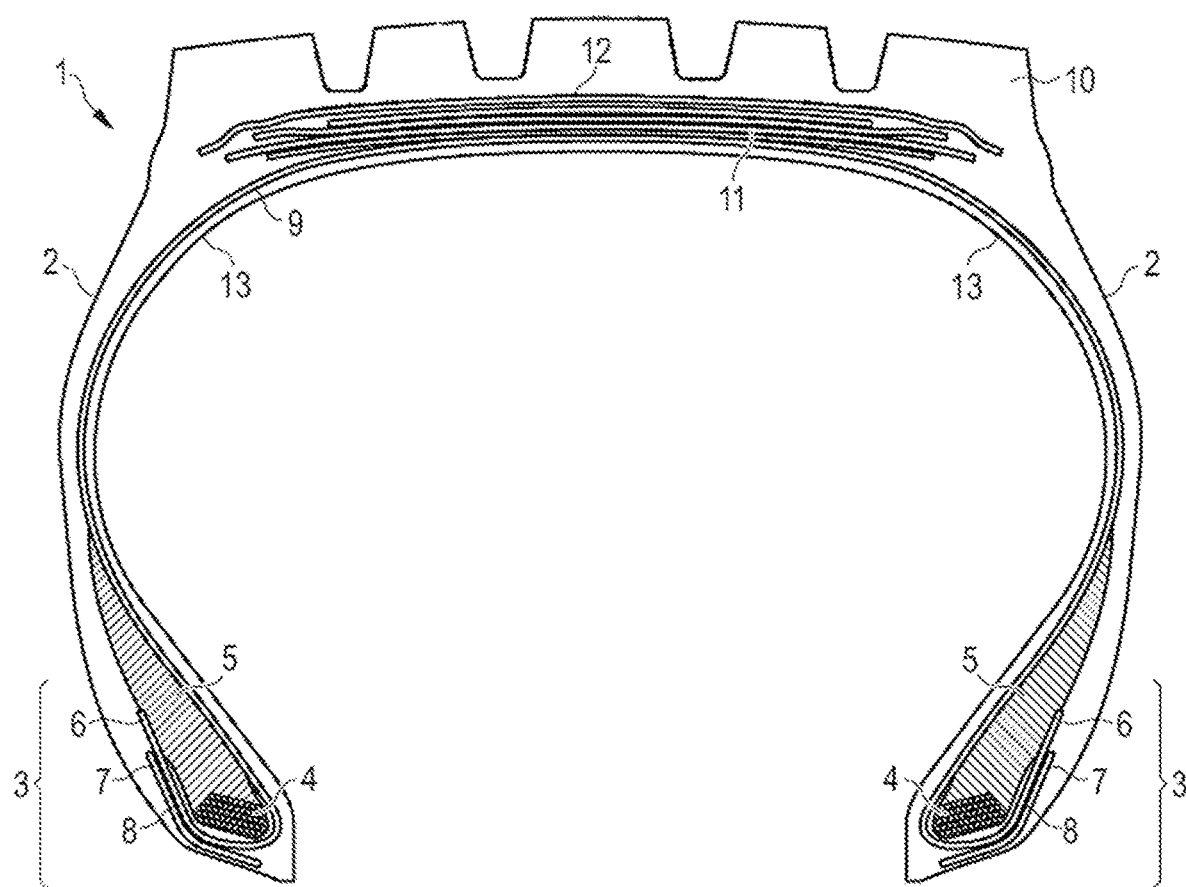

RUBBER COMPOSITION AND A TIRE

FIELD OF THE INVENTION

The present invention is directed to a rubber composition, in particular a tread rubber composition, and a tire comprising a rubber composition, especially a tire comprising a tread with said rubber composition.

BACKGROUND

As known in the tire art, it has traditionally been difficult to improve multiple tire characteristics at the same time without considerable trade-offs in at least another characteristic. One of such conflicts exists between rolling resistance and wet performance. When rolling resistance is to be improved, there are typically trade-offs in wet grip. However, limiting rolling resistance is crucial to increase energy efficiency. Another potential issue consists in maintaining abrasion at a limited level which helps to avoid quick tire wear and helps to provide sustainable products, preferably together with good ride and handling properties.

Thus, the provision of new rubber compounds, in particular tread rubber compounds, improving the balance between multiple of the above mentioned properties remains desirable.

SUMMARY OF THE INVENTION

A first object of the invention may be to provide a rubber composition with advanced hysteresis/rolling resistance performance and also good wet performance.

Another object of the present invention may be to provide a rubber composition with improvement in the above mentioned properties and/or improved abrasion properties or tread wear properties when used in a tire tread.

The present invention is defined by the scope of the independent claims. Preferred embodiments are provided in the dependent claims as well as in the summary of the invention provided hereinafter.

Thus, in a first aspect of the invention, a rubber composition is provided, the rubber composition comprising 70 phr to 90 phr of styrene butadiene rubber (preferably solution polymerized styrene butadiene rubber), comprising a first styrene butadiene rubber having a glass transition temperature within a range of −15° C. to −49° C. and a second styrene butadiene rubber having a glass transition temperature within a range of −50° C. to −89° C., and 10 phr to 30 phr of one or more of natural rubber and synthetic polyisoprene, 40 phr to 70 phr of silica, and 10 phr to 40 phr of at least one hydrocarbon resin selected from one or more of C5 (aliphatic) resins, CPD (cyclopentadiene) resins, DCPD (dicyclopentadiene) resins, C9 (aromatic) modified C5 resins, C9 modified CPD resins, C9 modified DCPD resins.

Such a rubber composition comprising a limited amount of silica in combination with the above mentioned resin types as well as a styrene butadiene rubber having a relatively high glass transition temperature and a styrene butadiene rubber having a relatively low glass transition temperature allows further improvement of hysteresis properties, or rolling resistance performance respectively, while essentially maintaining or even improving wet grip properties.

In one embodiment, the resin, in particular hydrocarbon resin, has one or more of a softening point within a range of 80° C. to 150° C., preferably within a range of 90° C. to 110° C.; a weight average molecular weight with within a range of 500 g/mol to 1000 g/mol, preferably within a range of 500 g/mol to 800 g/mol; and a glass transition temperature within a range of 30° C. to 60° C., preferably from 40° C. to 60° C. or even more preferably from 40° C. to 55° C.; an aromatic proton content (or in other words aromaticity) within a range of 5% to 15%, preferably 8% to 12%, as determined by NMR analysis.

Such resin types have been identified as particularly preferable candidates by the inventors.

In still another embodiment, the above resin is a hydrogenated (preferably fully hydrogenated) hydrocarbon resin.

In still another embodiment, the rubber composition comprises from 50 phr to 65 phr of the silica. This range has been identified by the inventors as the most preferable range for the present composition.

In yet another embodiment, the silica has a BET surface area within a range of 190 $m^2$/g to 260 $m^2$/g, preferably from 205 $m^2$/g to 260 $m^2$/g. In particular, such a relatively high surface area silica has been found to be most desirable in the present compositions.

In still another embodiment, the rubber composition further comprises from 0.1 phr to 10 phr of carbon black, preferably from 0.5 phr to 5 phr. In particular, it is desirable for the present composition to include a limited amount of carbon black.

In still another embodiment, the rubber composition further comprises from 4 phr to 10 phr of silane, preferably 4 phr to 8 phr of a blocked mercapto silane, such as preferably 3-Octanoylthio-1-propyltriethoxysilane. The presence of the later silane is particularly preferred to further improve rolling resistance properties with limited further tradeoffs.

In still another embodiment, the rubber composition comprises from 0 phr to 10 phr of liquid plasticizers (such as oil, liquid resins, and/or liquid diene-based polymers). In this context the term liquid plasticizer means that the plasticizer is in a liquid state at a temperature of 23° C. Preferably, the composition comprises less than 5 phr of liquid plasticizer, in particular less than 5 phr of oil.

In still another embodiment, the rubber composition comprises 40 phr to 60 phr of the first styrene butadiene rubber and 30 phr to 50 phr of the second styrene butadiene rubber, with preferably at least 5 phr more of the first styrene butadiene rubber than of the second styrene butadiene rubber.

In still another embodiment, the rubber composition comprises from 15 phr to 25 phr of natural rubber or synthetic polyisoprene, and/or preferably less than 23 phr of natural rubber or synthetic polyisoprene rubber. In particular, the claimed ranges of natural rubber or synthetic polyisoprene rubber have been found to be particularly desirable to achieve good tensile properties.

In still another embodiment, at least one of the first and the second styrene butadiene rubbers comprises at least one functional group configured for the coupling to the silica. Such functional groups are preferably selected from one or more of polysiloxy, alkylsiloxy, aminoalkylsiloxy, tin amino, amino siloxane, and amino silane groups. Preferably, functional groups are located at one or more chain ends of one or more of the styrene butadiene rubbers.

In still another embodiment, both styrene butadiene rubbers comprise at least one functional group configured for the coupling to silica.

In still another embodiment, one of the first and the second styrene butadiene rubbers is functionalized with at least one amino silane group (preferably at one or even more preferably at both chain ends) and another one of the first and the second styrene butadiene rubbers is functionalized with at least one amino siloxane group (preferably at at least one chain end).

In still another embodiment, the first styrene butadiene rubber has a glass transition temperature within a range of −20° C. to −40° C., preferably −20° C. to −35° C. and/or the second styrene butadiene rubber has a glass transition temperature within a range of −51° C. to −69° C., preferably −55° C. to −69° C. Amongst others, the combination of a high Tg styrene butadiene rubber with a low Tg styrene butadiene rubber allows for achieving a better balance between traction and abrasion, in particular compared to the use of only one relatively high Tg styrene butadiene rubber.

In still another embodiment, the first styrene butadiene rubber has a bound styrene content within a range of 5% to 50%, preferably 10% to 35%, and most preferably 20% to 35%; and/or the second styrene butadiene rubber has a bound styrene content within a range of 5% to 30%, and preferably within the range of 5% to 15%.

In yet another embodiment, the rubber composition comprises from 15 phr to 35 phr, preferably up to 30 phr of the resin. For instance, the rubber composition can contain from 15 phr to 30 phr of the resin.

In still another embodiment, the rubber composition comprises 1,6-bis(N,N-dibenzylthiocarbamoyldithio)hexane. In particular, this cross linking agent is deemed to further improve the abrasion resistance of the rubber composition in accordance with one or more of the aforementioned embodiments.

In still another embodiment, the glass transition temperature of the rubber composition is within a range of −25° C. to −15° C. In particular, lower glass transition temperatures would reduce wet performance.

In an embodiment, the rubber composition may include at least one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases, the ESBR will have a bound styrene content which is within the range of 26 to 31 percent. By emulsion polymerization prepared styrene-butadiene rubber (ESBR), it may be meant that styrene and 1,3-butadiene are copolymerized as an aqueous emulsion. Such are well known to those skilled in such art. The bound styrene content can vary, for example, from 5 percent to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared (or solution polymerized) SBR (SSBR) may be used, for example for the styrene butadiene rubbers as claimed. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis-1,4-microstructure content of synthetic cis-1,4-polyisoprene is typically at least 90% and is more typically at least 95%. In some cases the synthetic cis-1,4-polyisoprene will have a cis-1,4-microstructure content which is within the range of 95% to 99%.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference. In another preferred embodiment, the rubber composition is essentially free or free of PBD.

A glass transition temperature, or Tg, of a rubber/elastomer or elastomer composition, where referred to herein, represents the glass transition temperature(s) of the respective elastomer or elastomer composition in its uncured state or a cured state in the case of an elastomer composition. A Tg is determined herein as a peak midpoint by a differential scanning calorimeter (DSC) at a temperature rate of increase of 10° C. per minute, according to ASTM D3418.

A Tg for resins is determined as a peak midpoint by a differential scanning calorimeter (DSC) at a temperature rate of increase of 10° C. per minute, according to ASTM D6604 or equivalent. Preferably, the resin has a softening point above 100° C. as determined by ASTM E28 which might sometimes be referred to as a ring and ball softening point.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" and "formulation" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 100 to 300 square meters per gram. In another embodiment, the BET surface area may be in a range of 200 to 300 square meters per gram. In embodiments of the present invention said surface areas is preferably relatively high. The BET surface area is determined according to ASTM D6556 or equivalent and is described in the Journal of the American Chemical Society, Volume 60, Page 304 (1930).

In still another embodiment, the rubber composition may comprise pre-silanized and precipitated silica. In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl poly sulfides and organomercaptoalkoxysilanes. Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition is exclusive of addition of (added) precipitated silica to the rubber composition (thereby exclusive of addition of non-pre-silanized precipitated silica).

In an embodiment, the rubber composition may include carbon black. Some representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm$^3$/100 g to 150 cm$^3$/100 g. Iodine absorption values can be suitably determined according to ASTM D1510 or equivalent.

In one embodiment, the rubber composition may contain sulfur containing organosilicon compounds or silanes. Examples of suitable sulfur containing organosilicon compounds are of the formula:

$$Z\text{-Alk-}S_n\text{-Alk-}Z \qquad \text{I}$$

in which Z is selected from the group consisting of

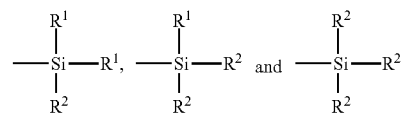

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

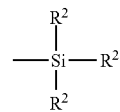

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one preferred embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 5 phr, usually 1 phr to 5 phr. However, in a preferred embodiment the composition is free of such tackifier resins. Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. In many cases microcrystalline waxes are utilized. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include diphenylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

In a second aspect of the present invention, a tire is provided, the tire comprising the rubber composition of the first aspect and/or one of its embodiments.

In one embodiment the tire comprises a tire tread comprising the rubber composition.

In another embodiment the tire is a summer tire.

In still another embodiment, the tire comprises a tire tread with a tread cap including at least two layers arranged at least partially on top of each other (in a radial direction of the tire), wherein the rubber composition is provided in a radially outermost tread cap layer (contacting the ground when driving). In addition, or alternatively, the rubber composition is provided in a radially inner tread cap layer (arranged radially below the radially outermost tread cap layer).

In still another embodiment, the rubber composition is included in a radially inner tread cap layer having essentially a U-shaped or an essentially L-shaped cross section wherein the radially inner tread cap layer contacts the road when driving in one or both shoulder areas of the tread and the radially outer or outermost tread cap layer contacts the road in a center area of the tread and optionally in one of the shoulder areas of the tread.

In another embodiment, the tire of the present invention may for example be a pneumatic tire or nonpneumatic tire. The tire may also be a radial or bias ply tire. Preferably, the tire is a radial pneumatic tire.

In an embodiment, vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

It is emphasized that one or more aspects, embodiments, or features thereof, may be combined with one another within the scope of the present invention.

The subject invention more specifically reveals a ire which is comprised of a generally toroidal-shaped carcass with an outer circumferential tread, two sidewalls, two spaced beads, at least one ply extending from bead to bead and sidewalls extending radially from and connecting said tread to said beads, wherein said tread is adapted to be ground-contacting, and wherein the outer circumferential tread is comprised of a rubber composition comprising: (a) 70 phr to 90 phr of styrene butadiene rubber, comprising a first styrene butadiene rubber having a glass transition temperature within a range of −49° C. to −15° C. and a second styrene butadiene rubber having a glass transition temperature within a range of −50° C. to −89° C.; (b) 10 phr to 30 phr of one or more of natural rubber and synthetic polyisoprene; (c) 40 phr to 70 phr of silica; and (d) 10 phr to 40 phr of at least one hydrocarbon resin selected from one or more of C5 resins, CPD resins, DCPD resins, C9 modified C5 resins, C9 modified CPD resins, C9 modified DCPD resins.

BRIEF DESCRIPTION OF THE DRAWINGS

The structure, operation, and advantages of the invention will become more apparent upon contemplation of the following description taken in conjunction with the accompanying drawing, wherein:

FIG. 1 is a schematic cross section of a tire comprising a tread and further rubber components.

DETAILED DESCRIPTION OF THE EMBODIMENTS

FIG. 1 is a schematic cross-section of a pneumatic tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The tread 10 comprises one or more tread compounds as described herein in accordance with embodiments of the invention.

While the embodiment of FIG. 1 suggests a plurality of tire components including for instance apexes 5, chippers 7, flippers 8 and an overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves. The present invention shall not be limited to the example of the tire 1 depicted and described in accordance with FIG. 1.

Preferred examples of rubber compositions in accordance with embodiments of the present invention, i.e. Inventive Examples 1 to 4 (which are particularly suitable for a tire tread 10), are shown in TABLE 1 in comparison with two Comparative Examples 1 and 2 which are not in accordance with the present invention. All Examples comprise a combination of natural rubber (polyisoprene) and styrene butadiene rubber. In particular, the presence of polyisoprene rubber is deemed beneficial for the present composition types with regard to well-balanced tensile properties. Moreover, all examples are based on a combination of a high Tg styrene butadiene rubber with a low Tg styrene butadiene rubber as listed in TABLE 1.

All compositions (apart from Comparative Example 1) rely on moderate amounts of high surface area silica wherein Inventive Examples 2 and 5 have an even higher surface area silica type. The Inventive Examples further comprise a blocked mercapto silane, whereas the Comparative Examples rely mainly on a bis-triethoxysilylpropyl disulfide type silane. With regard to resins, the Comparative Examples have a terpene resin whereas the Inventive Examples include a DCPD resin type. Furthermore, all examples comprise 1,6-bis(N,N-dibenzylthiocarbamoyldithio)hexane (BDBzTH) which has essentially been utilized to support the abrasion resistance of the composition, which is also an important property for many tread rubber compositions.

TABLE 1

| Ingredients | Comparative Example 1 | Comparative Example 2 | Inventive Example 1 | Inventive Example 2 | Inventive Example 3 | Inventive Example 4 |
| --- | --- | --- | --- | --- | --- | --- |
| | | | phr | | | |
| Natural rubber | 20 | 20 | 20 | 20 | 20 | 20 |
| SSBR 1[1] | 45 | 35 | 0 | 0 | 0 | 0 |
| SSBR 2[2] | 35 | 45 | 45 | 45 | 60.95 | 60.95 |
| SSBR 3[3] | 0 | 0 | 36.75 | 36.75 | 20 | 20 |
| Silica 1[4] | 70 | 57 | 57 | 0 | 57 | 0 |
| Silica 2[5] | 0 | 0 | 0 | 50 | 0 | 50 |
| Silane 1[6] | 0 | 0 | 4.6 | 5 | 4.6 | 5 |
| Silane 2[7] | 7 | 5.7 | 0 | 0 | 0 | 0 |
| Stearic Acid | 2 | 2 | 2 | 2 | 2 | 2 |
| Resin 1[8] | 26.5 | 21 | 0 | 0 | 0 | 0 |
| Resin 2[9] | 0 | 0 | 21 | 21 | 21 | 21 |
| Silane 3[10] | 2 | 2 | 2 | 2 | 2 | 2 |

TABLE 1-continued

| Ingredients | Comparative Example 1 | Comparative Example 2 | Inventive Example 1 | Inventive Example 2 | Inventive Example 3 | Inventive Example 4 |
|---|---|---|---|---|---|---|
| | | | phr | | | |
| Waxes | 3 | 3 | 3 | 3 | 3 | 3 |
| Antidegradants[11] | 3 | 3 | 3 | 3 | 3 | 3 |
| Zinc Oxide | 1.1 | 1.1 | 1.1 | 1.1 | 1.1 | 1.1 |
| Sulfur | 0.6 | 0.6 | 0.75 | 0.9 | 0.75 | 0.9 |
| BDBzTH[12] | 2.2 | 2.2 | 2.2 | 2.2 | 2.2 | 2.2 |
| Accelerators[13] | 3.1 | 2.9 | 2.9 | 3 | 2.9 | 3 |

[1]Thio-functionalized, solution-polymerized styrene butadiene rubber as SLR3402 from Trinseo, having a Tg of −62° C.
[2]Amino silane-functionalized solution-polymerized styrene butadiene rubber as HPR355H from JSR having a Tg of −27° C.
[3]Amino siloxane-functionalized solution-polymerized styrene butadiene rubber as F1038 from LG Chem having a Tg of −62° C., with 5% oil extension by weight
[4]Precipitated silica as Zeosil ™ Premium 200 MP with a BET surface area of about 215 $m^2/g$
[5]Precipitated silica with a BET surface area of about 250 $m^2/g$
[6]3-Octanoylthio-1-propyltriethoxysilane as NXT ™ from Momentive
[7]Bis-triethoxysilylpropyl disulfide as SI 266 from Evonik
[8]Alpha pinene terpene resin as Dercolyte ™ A115 from DRT
[9]C9 modified and hydrogenated DCPD resin as Oppera ™ 383 from Exxon Mobil
[10]50% bis-triethoxysilylpropyl tetrasulfide on 50% N330 carbon black carrier, as X50S from Evonik
[11]Mixed p-phenylene diamine types
[12]1,6-bis(N,N-dibenzylthiocarbamoyldithio)hexane as Vulcuren ™ from Lanxess
[13]Sulfenamide and guanidine types The rubber compositions listed above in TABLE 1 have been tested in tire treads of passenger car tires of same construction. Results of these tests for rolling resistance and wet braking are shown in TABLE 2 below. Moreover, these compositions have been tested with regards to their stiffness and abrasion properties as also shown in TABLE 2.

Comparative Example 1 (not in accordance with the present invention) comprises considerably more silica than the other tested compositions which may be a reason for the larger stiffness observed for Comparative Example 1 compared to the other tested Examples. However rolling resistance of Comparative Example 1 is significantly worse compared to the other Examples in this comparison. Comparative Example 2 (also not in accordance with the present invention) has the same filler composition as the Inventive Examples 1 and 3, which may be one reason for the improved rolling resistance performance but potentially also for a decreased wet braking performance. At the same time, compound stiffness is reduced for Comparative Example 2 and the Inventive Examples 1 to 4 compared to Comparative Example 1 which may have an impact on the ride and handling properties of the tire. In addition, Comparative Example 2 has a significantly increased abrasion over the abrasion observed for Comparative Example 1.

The Inventive Examples have all a significantly improved rolling resistance over Comparative Example 1. While Comparative Example 2 may have a slightly better rolling resistance performance than Inventive Examples 3 and 4, the overall balance between rolling resistance, wet braking and abrasion is improved for the Inventive Examples. Inventive Examples 1 and 2 have particular strengths in rolling resistance and abrasion. Remarkably, Inventive Example 1 shows a significant improvement in rolling resistance with very limited tradeoff in wet performance and abrasion. Inventive Example 3 shows improved rolling resistance and wet braking performance at the same time. In particular, the wet braking performance of Inventive Examples 1, 3 and 5 is considerably better than the same performance of Comparative Example 2. Moreover, in view of the considerably improved rolling resistance, it is also of advantage to use one or more of the Inventive Examples in a bottom tread cap layer of a tire tread. In such case, the slightly increased abrasion of some of the Examples is not very relevant, the same applies to the wet braking performance. However, the preferred application of the Inventive Examples would be in a radially outermost tread cap layer of a tire tread.

TABLE 2

| Performances/ Properties | Comparative Example 1 | Comparative Example 2 | Inventive Example 1 | Inventive Example 2 | Inventive Example 3 | Inventive Example 4 |
|---|---|---|---|---|---|---|
| Rolling Resistance[a] | 100 | 103.6 | 110.9 | 106.8 | 102.7 | 102.7 |
| Wet Braking[b] | 100 | 96.7 | 99.1 | 95.7 | 103.8 | 99.4 |
| Compound stiffness[c] | 1.4 | 1.2 | 1.2 | 1.2 | 1.1 | 1.2 |
| Abrasion[d] | 128 | 136 | 129 | 126 | 136 | 132 |

[a]Relative tire test results, normalized to Comparative Example 1 (higher is better)
[b]Relative tire test results, normalized to Comparative Example 1 (higher is better)
[c]Compound test results showing G' at 1% strain, obtained with an RPA 2000 ™ Rubber Process Analyzer of the company Alpha Technologies, based on ASTM D5289.
[d]Rotary drum abrasion test according to ASTM D5963 or equivalent.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case, the above described embodiments and examples shall not be understood in a limiting sense.

The invention claimed is:

1. A tread being formed of a rubber composition comprising:
   70 phr to 90 phr of styrene butadiene rubber, comprising a first styrene butadiene rubber having a glass transition temperature within a range of −20° C. to −35° C. and a second styrene butadiene rubber having a glass transition temperature within a range of −61° C. to −69° C.;
   10 phr to 30 phr of one or more members selected from the group consisting of natural rubber and synthetic polyisoprene rubber;
   50 phr to 65 phr of silica, wherein the silica has a BET surface area which is within the range of 190 m$^2$/g to 260 m$^2$/g; and
   15 phr to 40 phr of at least one hydrocarbon resin selected from one or more of C9 modified CPD resins, C9 modified DCPD resins, and resins characterized by an aromatic proton content within a range of 5% and 15%.

2. The tread according to claim 1 wherein the resin has a glass transition temperature within a range of 30° C. to 60° C.

3. The tread according to claim 1 wherein the resin has an aromatic proton content within a range of 5% to 15%.

4. The tread according to claim 1 wherein said resin is at least partially hydrogenated.

5. The tread according to claim 1 wherein the reinforcing silica has a BET surface area within a range of 205 m$^2$/g to 260 m$^2$/g.

6. The tread according to claim 1 further comprising one or more of:
   from 0.1 phr to 10 phr of carbon black;
   from 4 phr to 8 phr of reinforcing silane;
   from 4 phr to 7 phr of a blocked mercapto silane;
   from 0 phr to 10 phr of liquid plasticizers.

7. The tread according to claim 1 comprising 40 phr to 60 phr of the first styrene butadiene rubber and 30 phr to 50 phr of the second styrene butadiene rubber.

8. The tread according to claim 1 wherein at least one of the first and the second styrene butadiene comprises at least one functional group configured for the coupling to the silica, and wherein said functional group is selected from one or more of polysiloxy, alkylsiloxy, amino alkylsiloxy, tin amino, amino siloxane, and amino silane groups.

9. The tread according to claim 1 comprising from 15 phr to 30 phr of the resin.

10. The tread according to claim 1 wherein the resin has a softening point within a range of 80° C. to 150° C. and a weight average molecular weight within a range of 500 g/mol to 1000 g/mol.

11. The tread according to claim 10 wherein the resin has a softening point within a range of 90° C. to 110° C.

12. The tread according to claim 10 wherein the resin has a weight average molecular weight Mw within a range of 500 g/mol to 800 g/mol.

13. The tread according to claim 1 wherein at least one of the first and the second styrene butadiene comprises at least one functional group configured for the coupling to the silica.

14. The tread according to claim 13 wherein each styrene butadiene rubber comprises at least one functional group configured for the coupling to silica.

15. The tread according to claim 13 wherein one styrene butadiene rubber of the first and the second styrene butadiene rubbers is functionalized with an amino silane group and another one of the first and the second styrene butadiene rubbers is functionalized with an amino siloxane group.

* * * * *